April 10, 1962 W. BUNNELL 3,028,771
REVOLVING DEEP DRILLER
Filed June 23, 1958 2 Sheets-Sheet 1
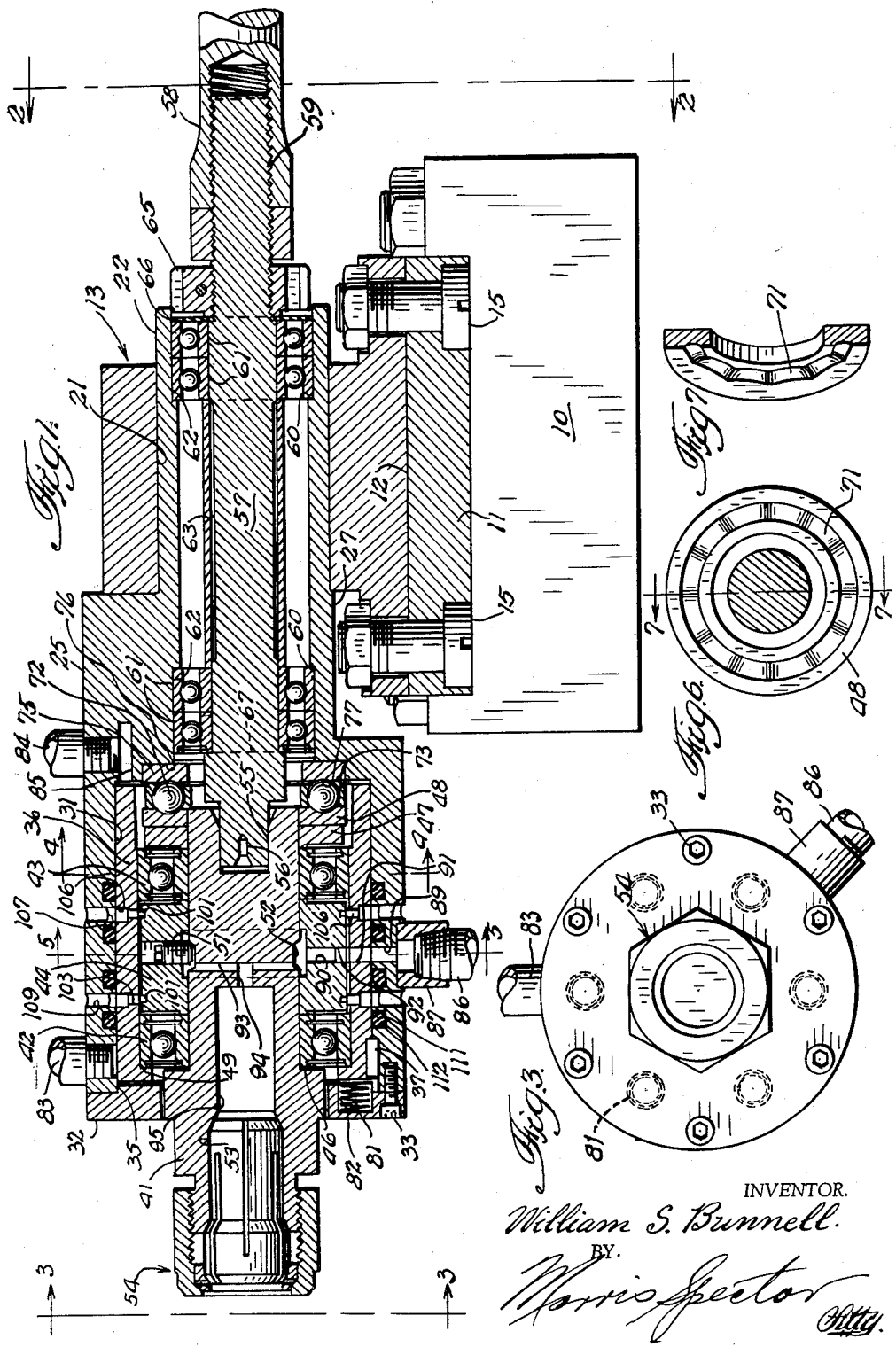
INVENTOR.
William S. Bunnell.
BY
Morris Spector
Atty.

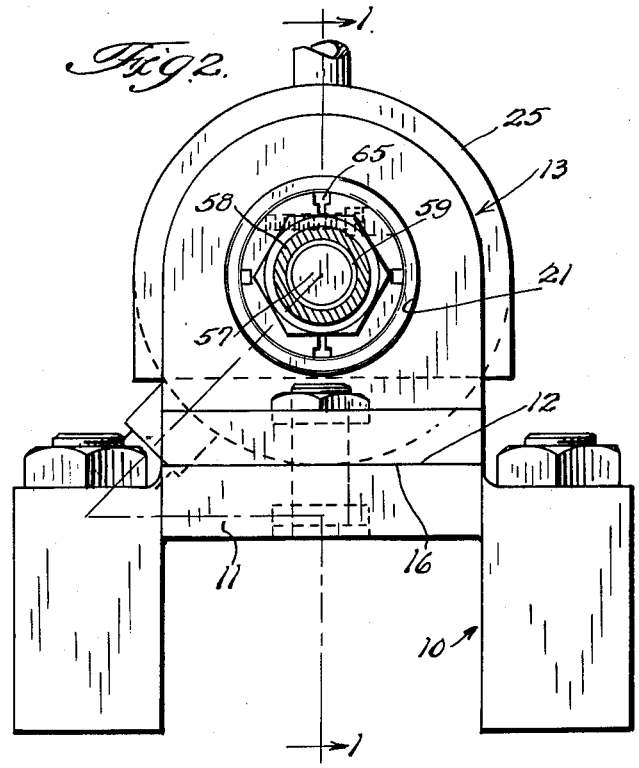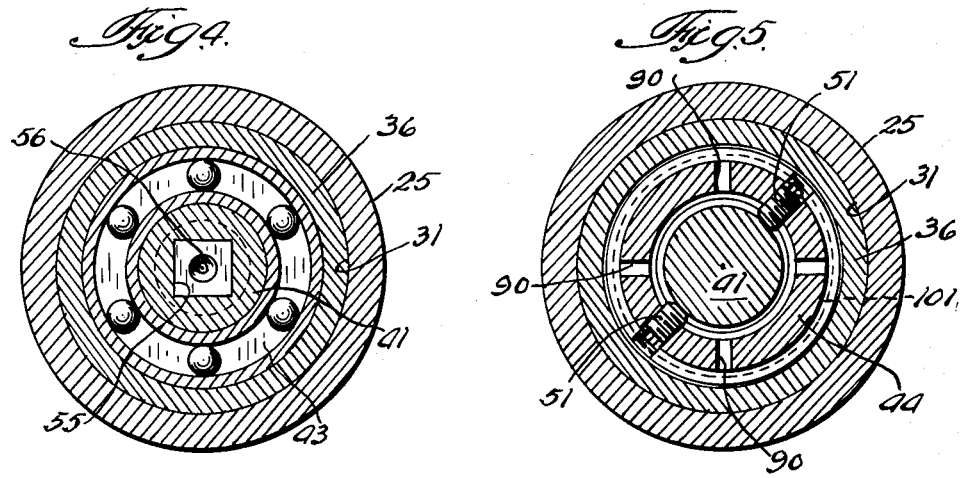

United States Patent Office 3,028,771
Patented Apr. 10, 1962

3,028,771
REVOLVING DEEP DRILLER
William Bunnell, La Grange Park, Ill., assignor to Boyar-Schultz Corporation, Chicago, Ill., a corporation of Illinois
Filed June 23, 1958, Ser. No. 743,760
14 Claims. (Cl. 77—32.3)

This invention relates to machine tools, and more particularly to a drilling attachment for use on automatic screw machines, turret lathes and other machines, for drilling machineable material such as metal, particularly drilling deep holes, that is, holes wherein the depth is very great in relation to the diameter of the hole. This invention is particularly concerned with attachments whereby during the drilling operation there is imparted to the work or to the drill a small but rapid reciprocatory movement for the purpose of pulverizing the drilled material to minimize the effects of the waste drilled material upon the drill, for reasons known in the art.

In its more particular aspects the present invention is concerned with a drilling attachment or tool that has a combined rotary and reciprocating movement. In order to facilitate speed and accuracy of operation, there must be a very rapid relative rotation between the work piece and the drill.

It is one of the objects of the present invention to provide a tool holder having rotatable bearings for guiding the rotor in its rotation and which tool holder is provided with a separate means or part so arranged as to relieve the bearings of axial thrust to maximum extent.

It is a further object of the present invention to provide a rotary and reciprocating drilling attachment of the character described with means for circulating a coolant to the working area of the drill.

It is a still further object of the present invention to provide an attachment of the above mentioned character with means for providing efficient lubrication to the moving parts and means for preventing undesirable admixture of the coolant with the lubrication.

In the tool of the present invention the tool holder that reciprocates as it rotates is arranged to be driven by a drive shaft that has a rotary but not reciprocating motion.

It is one of the objects of the present invention to provide a drive shaft of a tool holder of the above mentioned character with axially spaced bearings to minimize the frictional effects of rotation of the drive shaft, and to provide for preloading of the bearings in an axial direction to minimize wear on the bearings that might otherwise result from the vibration of the tool holder acting on the drive shaft to produce wear in the bearings due to inherent small amount of slackness that might otherwise be present in the bearings.

It is a still further object of the present invention to provide a drilling head in which a cam mechanism is used for producing axial vibratory movement and which includes improved biasing means for maintaining the cam and the cam follower together.

Other objects will appear from the ensuing description which, taken with the accompanying drawings, discloses a preferred mode of carrying the several features of the invention into practice.

In this drawing:

FIG. 1 shows a longitudinal cross section of my drilling attachment as mounted on a lathe turret, said section being taken along the line 1—1 of FIGURE 2;

FIG. 2 is a cross section taken on the line 2—2 of FIG. 1;

FIG. 3 is an end elevation viewed in the direction of the arrows 3—3 of FIG. 1;

FIGS. 4 and 5 are cross sections respectively taken on the lines 4—4 and 5—5 of FIG. 1;

FIG. 6 is a detail showing the working face of the annular cam; and

FIG. 7 is a section in perspective, taken substantially on the line 7—7 of FIG. 6.

Regarded broadly the invention, in one aspect comprises a housing having a cylindrical bore or guide for receiving a reciprocable sleeve within which the drill arbor is carried for rotation with respect to the sleeve and for reciprocation therewith. Annular cam means including ball followers are arranged to reciprocate the sleeve against the bias of a group of compression springs distributed equally about the axis of reciprocation thereby to provide a balanced force on the cam and followers to reduce any tendency toward erratic performance on the part of the reciprocating parts of the attachment. In another aspect the arrangement for feeding coolant to the central bore of the drills customarily utilized for deep drilling includes features for insuring, to the greatest possible degree, against admixture of the coolant with the lubricant. However, means are also included for disposing of inevitable seepage of coolant in a manner calculated to avoid thinning of the lubricant thereby.

While the invention attachment is adaptable to various mountings I have shown the same exemplificatively supported at one station of a lathe turret. Thus, turning to FIGS. 1 and 3 a support 10 of the turret includes a pad 11 having a flat surface 12 upon which a mounting bracket 13 is secured by bolts 15. The abutting surfaces 16 and 12 are accurately ground on a plane which insures that the axis of the drill will be at some predetermined angle to the work piece.

Bracket 13 has a bore 21 to receive the shank 22 of the drill arbor. Clamping means (not shown) of any suitable construction secure the shank in the bracket 13. Shank 22 is an extension of a housing 25, desirably cylindrical, which may be cut out, as at 27, to clear parts of the turret or other mounting, as required. However, in general, the shank 21 and housing 25 are as massive as space will allow in order that the overhanging, left hand portion of the attachment may be subjected to minimum deflection under load.

The housing 25 has a bore 31 (FIG. 4) closed by a retaining cover 32 which is secured by a number of cap screws 33 distributed about the periphery. Alignment is assured by a pilot 35 accurately fitting the bore 31.

The housing 25 and its integral shank 22 may be cast iron. An accurately maintained working surface and carrier for the reciprocable parts of the holder is provided by a hardened steel bearing sleeve 36 which is slidably fitted into the bore 31 and restrained against rotation therein by a plurality of axial dowels or retaining pins 37 received in complemental semi-cylindrical notches in the bore 31 and sleeve 36; the fit being such that reciprocating movement is permitted.

A tool holder or arbor 41 is supported for rotation on anti-friction ball bearings 42 and 43 the races of which are spaced apart by a tool holder collar 44. The bearing 42 abuts a shoulder 46 of the spindle or arbor, and also abuts an internal shoulder 49 at one end of sleeve 36. The bearings are retained by a thrust ring 47 which, in turn, is retained by a bearing cam race 48 to be described subsequently. Collar 44 is secured to the arbor 41 by one or more set screws 51 entering a circumferential groove 52 in the spindle. It will be noted that the set screws are flat-ended and slightly chamfered to bear against a wall of the groove 52, which is trapezoidal in transverse cross section, to obtain both radial and axial locking force of the set screws.

At its left end the arbor 41 is provided with a socket 53 and with means for locking a drill bit, e.g. a collet 54 having the usual collet clamping camming ring arrangement of well-known construction which collet keeps the work centered in the tool holder as the collet ring is tightened.

At its opposite end the arbor has a square bore 55 receiving a corresponding shaped male end 56 of the drive shaft 57, although it is within the scope of the invention to apply the driving force directly to the arbor. Driving force is transmitted through any suitable means, e.g. a rotatable shaft 58 connected to the protruding end 59 of the drive shaft 57. This latter is carried on anti-friction bearings 62, the outer races of which are fitted into shouldered bores 61 in the housing 25. There is provided a bearing spacing sleeve 63 on shaft 57, having its ends abutting the inner races of the bearings 62. A split bearing lock nut 65 and washer 66 retain the bearings and sleeve against a shoulder 67 of the shaft 57. More particularly, the lock nut 65 serves, upon draw-up, to stress the inner races of bearings 62 and the sleeve 63 in compression between drive shaft shoulder 67 and the lock nut, whereby to retain the bearings against unwanted displacements due to so-called hammer effects imposed on the bearing consequent to the rapid, short-stroke reciprocation of the arbor as hereinafter described. It will be observed that, by choosing a substantial length for the shank 22, the shaft 57 may be supported at sufficiently widely-spaced points as to minimize run-out due to normal running clearances encountered in commercial anti-friction bearings. Moreover, additional accurate maintenance of the axis of the shaft 57 is achieved by providing shoulders in the bore of the shank 22 for abutment by the outer races of the bearings 62.

The cam race 48 is press fitted on to the tool holding spindle 41 for rotation therewith, and presses the bearings 42—43 and the collar 44 towards the left on the spindle 41, as seen in FIG. 1, and the collar is locked in that position by the set screws 51. Ball bearings 72 are retained in a cage 73 and roll between the annular bearing cam race 48 and a race 75 that is held in a recess 76 in the housing 25. Reciprocating chip breaking movement is obtained by providing the annular bearing cam race 48 with undulations comprising a plurality of rises and falls 71 in circular arrangement. These are, in one preferred embodiment, of a height of the order of 0.006 inch, that is, the height of the rise in a direction axially of the unit from the lowest point in the valley. In that construction the cam race ring 48 was of an internal diameter of the order of one inch. This imparted an axial stroke to the tool holder of a magnitude of 0.006 inch. Rotary movement of the shaft 58 is transmitted to the collet 54 through the tool holding arbor 41 that is directly coupled to the drive shaft 57.

The outer rings of the ball bearing races 42—43 fit snugly into the bore of the hardened steel sleeve 36 so that while the tool holder 41 is rotatable in the sleeve, it does not move axially with respect to the sleeve. Instead, the sleeve 36 moves axially with the tool holder 41 which is rotatable within the sleeve. The sleeve 36 with its assembled tool holder 41 and intervening cam race 48 is assembled within the bore 31 of the body 25 where the assembly is reciprocable in its chip breaking movement.

It is to be noted that there is no reciprocation of the tool holder 41 with respect to the races of the ball bearings 42—43 so that there is no axial thrust on the balls in those races.

The reciprocating movement is caused by the fact that rotation of the spindle 41 will also rotate the cam race 48 so that the undulations thereof, passing by the balls 72 will thrust the race 48 and with it the spindle 41, sleeve 36 and the parts carried thereby to the left. Reverse reciprocating movement is effected by a plurality of compression springs 81 in individual bores or seats 82 in the cap 32 and bearing on the left end surface of the sleeve 36.

As alluded to heretofore, reciprocation of the drill is effective in breaking up the borings and relieving the load on the drill.

Lubrication of the various working parts within the housing 25 and shank 22 is effected through oil cups 83 and 84. The former feeds the left hand end of the assembly and the latter the right hand end via a passage 85.

In production work, and especially deep drilling, drills having an axial bore for feeding coolant to the cut surface and the wall of the hole are often employed. To this end the invention includes means for conducting the coolant from a source of pressured supply to the bore of the drill. Thus, referring to FIG. 1, a coolant supply pipe 86 is threaded into a fitting 87, from which passages 89 and 91 in the housing 25 and sleeve 36 feed the coolant to a circumferential groove 92 in the collar 44. From thence it flows through a plurality of radial holes 90 and 93 to an axial branch 94 to the axial space 95 in communication with the collet 54 and therefore with the axial bore of the drill bit. Accordingly, by reason of the groove 92 coolant may be circulated continuously from the supply to the bore of the drill.

Inasmuch as the coolant is of lower viscosity than the lubricant and the running clearance between the parts will inevitably allow some admixture of the coolant with the lubricant whereby to affect the latter deleteriously means are provided to bleed seepage coolant from the zones where its concentration due to leakage will be greatest, namely, in a zone surrounding the collar 44. Accordingly there is provided one or more circumferential grooves 101 in the collar 44 and aligned circumferential grooves 103 in the inner surface of the sleeve 36. Fluid communication between the grooves 103 and the exterior of the sleeve 36 is provided by a plurality of radial bores 106. Another pair of annular grooves 107 is cut in the inner periphery of the housing 25 in alignment with the bores 106. It will be understood that, since the sleeve 36 is reciprocated relative to the housing 25 the width of the grooves 107 must be such as to result in register with the bores 106 at all points of the stroke. A plurality of radial ports 109 through the lateral wall of the housing 25 provide fluid communication between the grooves 107 and atmosphere. O-rings 111 or equivalent packing situated in grooves 112 on the interior lateral wall of the housing 25 seal the grooves 107 and bores 106 against leakage.

As a result of the construction just described any coolant issuing from the holes 90 and by-passing the collar 44 will be accumulated in the grooves 101, 106 and 107, will bleed through the ports 109 and drip off the housing. Since the parts are manufactured to close tolerances the bleed rate will be small. However, seepage coolant will be substantially completely prevented from thinning the lubricant.

While I have shown a particular embodiment of my invention, it will be understood, of course, that I do not wish to be limited thereto since many modifications may be made and I therefore contemplate by the appended claims to cover any such modifications as fall within the true spirit and scope of my invention.

I claim:

1. In a deep drilling attachment including a chip breaking function, for securement to a lathe or the like and in which the drill is rotated, the combination comprising: a housing having means for supporting the same on the lathe or the like and a cylindrical bore coaxial with the drilling axis, a cylindrical sleeve having an annular end face slidably received in said bore for reciprocating movement therein, an arbor rotatably supported in said sleeve having means for connection to a power source and means for mounting a drill bit, a wave cam operatively associated with said sleeve for actuating the same in one direction of its stroke, a plurality of independently compressible springs interposed between said housing and sleeve for biasing said sleeve in the other direction of its stroke, said springs being uniformly spaced around said end face to provide a bias force distributed in a balanced manner about the axis of reciprocation.

2. In a deep drilling attachment including a chip breaking function, for securement to a lathe or the like and in which a hollow drill is rotated, the combination comprising: a housing having means for supporting the same on the lathe or the like and a cylindrical bore coaxial with the drilling axis, a cylindrical sleeve having an annular end face slidably received in said bore for reciprocating movement therein, an arbor having means for connection to a power source and means for mounting the drill, means interposed between said sleeve and arbor for supporting said arbor for rotation with respect to said sleeve and for reciprocation therewith, cam means operatively associated with said sleeve for actuating the sleeve and arbor in one direction of the stroke, means interposed between said housing and sleeve for biasing said sleeve and arbor in the opposite direction of the stroke, a pipe connection in said housing to receive a pressure supply of coolant, means defining a passage in the housing forming a continuation of said connection, means defining a passage in the sleeve in register with the housing passage in all positions of the stroke, means defining a first passage in the arbor in communication with said sleeve passage, means defining a second passage in the arbor in fluid communication with the interior of drill, all of said passages receiving coolant to feed the drill, means in said housing defining another passage therein for supplying lubricant to the interior of the housing, said sleeve having channel means for accumulating coolant seeping out of said coolant passages, said housing having channel means providing fluid communication between said sleeve channels and the exterior of the housing in all operative positions thereof for bleed of said seepage coolant to said exterior.

3. The combination in accordance with claim 2 wherein said sleeve channel means comprises a groove in the outer periphery of the sleeve.

4. The combination in accordance with claim 2 wherein said housing channel means comprises a groove in the interior periphery of the housing.

5. In a deep drilling attachment including a chip breaking function, for securement to a lathe or the like and in which the drill is rotated, the combination comprising: a housing, an elongated, hollow shank integral with said housing for mounting the housing on the lathe or the like, said housing having a cylindrical bore, a sleeve supported in said bore for sliding reciprocable movement, a drill arbor rotatably carried in anti-friction bearings in said sleeve and reciprocable with said sleeve, a wave cam and follower means interposed between said sleeve and housing for reciprocating the arbor, bias means for maintaining operating relation of the follower means and cam, a drive shaft for said arbor having a splined connection therewith, said shaft passing through said shank, and anti-friction bearings at each end of the shank for supporting said shaft.

6. In a deep drilling attachment including a chip breaking function, for securement to a lathe or the like and in which the drill is hollow and rotated, the combination comprising: a housing, means for supporting said housing on the lathe or the like, said housing having an opening therein, a sleeve complemental to said opening and reciprocatably carried therein, a drill arbor rotatably mounted in bearings in said sleeve and secured thereto for reciprocation therewith, passage means for feeding lubricant to said sleeve and bearings, passage means for feeding coolant to the interior of the drill, and bleed passages extending from the space intermediate the arbor and sleeve to the exterior of the housing for efflux of seepage coolant.

7. In a deep drilling attachment including a chip breaking function, for securement to a lathe or the like in which the drill is rotated, the combination comprising: a housing having a bore, a sleeve reciprocably mounted in said bore, a rotatable drill arbor including means for holding a drill bit, a pair of spaced apart anti-friction bearings intermediate said sleeve and arbor supporting said arbor for rotation relative to said sleeve and reciprocable movement therewith, means for axially reciprocating said sleeve and arbor, said housing having an elongated, hollow extension for reception in clamping means forming part of the lathe, a drive shaft for said arbor, said drive shaft passing through said extension and being drivingly coupled to said arbor to permit reciprocation of the arbor relative thereto, and additional anti-friction bearings for said drive shaft including an inner race, an outer race and rollable elements therebetween, said bearings being spaced apart along the length of the extension, said extension having shoulders for abutment by said outer races to maintain a fixed axial distance therebetween, and a spacing member between said inner races for maintaining a fixed axial distance therebetween.

8. In a machine tool attachment providing a drive for work piece drilling, a housing adapted for machine tool mounting and having a cylindrical bore, a bearing sleeve reciprocable in said bore, means retaining said sleeve against rotation in the bore, an arbor, bearing means between said sleeve and arbor rotatably supporting the latter in the sleeve, said bearing means including inner and outer races with rollable elements therebetween, means for rotating said arbor, and means including camming means operated by rotation of said arbor for causing reciprocation of the arbor and said sleeve.

9. In a machine tool attachment providing a drive for work piece drilling, a housing adapted for machine tool mounting and having a cylindrical bore, a bearing sleeve reciprocable in said bore, means retaining said sleeve against rotation in the bore, an arbor, bearing means between said sleeve and arbor rotatably supporting the latter in the sleeve, means for rotating said arbor, means locking the arbor and the sleeve against relative reciprocation while permitting rotation of the arbor in the bore, means for imparting reciprocating movement to the arbor and sleeve as a unit, and cooperating means on the arbor and bearing sleeve for preventing axial thrust on the bearing means during reciprocation of the arbor and sleeve.

10. In a machine tool attachment providing a drive for work piece drilling, a housing adapted for machine tool mounting and having a cylindrical bore, a bearing sleeve reciprocable in said bore, means retaining said sleeve against rotation in the bore, an arbor, bearing means between said sleeve and arbor rotatably supporting the latter in the sleeve, means for rotating said arbor, means locking the arbor and the sleeve against relative reciprocation while permitting rotation of the arbor in the bore, and means for imparting reciprocating movement to the arbor and sleeve as a unit, means for supplying lubricant to the relatively reciprocating contacting surfaces and to the bearing means, means for circulating cooling liquid through the arbor by way of the housing, and means in said housing for preventing mixing of the cooling liquid with the lubricant.

11. In a machine tool attachment providing a drive for work piece drilling, a housing adapted for machine tool mounting and having a cylindrical bore, a bearing sleeve axially movable in said bore and having a shoulder adjacent one end thereof, means retaining the sleeve against rotation in the bore, an arbor, a bearing between said sleeve and arbor rotatably supporting the latter coaxially of the sleeve, said bearing engaging said sleeve shoulder, a collar secured on said arbor and engaging the bearing, yieldable means engaging said one end of the sleeve biasing the sleeve and said arbor in one direction axially of the housing bore, means for rotating said arbor, and means for axially moving the sleeve and arbor in the opposite direction, said last means including a camming element rotatable with said arbor, said camming element being operable by rotation of said arbor, and in cooperation with said yieldable means causing reciprocation of the arbor and said sleeve.

12. In a machine tool attachment providing a drive for work piece drilling, a housing adapted for machine tool mounting and having a cylindrical bore, a bearing sleeve axially movable in said bore and having a shoulder adjacent one end thereof, means retaining the sleeve against rotation in the bore, an arbor, a pair of axially spaced bearings between said sleeve and arbor rotatably supporting the latter coaxially of the sleeve, one of said bearings engaging said sleeve shoulder, a collar secured on said arbor between said bearings and engaging the bearings, the other of said bearings pressing said collar towards said one bearing and pressing said one bearing towards said sleeve shoulder, yieldable means engaging said one end of the sleeve biasing the sleeve and said arbor in one direction axially of the housing bore, means for rotating said arbor, and camming means including a camming element rotatable with said arbor, arranged between the housing and the other of said bearings, said camming means being operable by rotation of said arbor and in cooperation with said yieldable means causing reciprocation of the arbor and said sleeve.

13. In a machine tool attachment providing a drive for work piece drilling, a housing adapted for machine tool mounting and having a cylindrical bore, a bearing sleeve reciprocable in said bore, means retaining the sleeve against rotation in the bore, an arbor having a socket, said arbor being located within said sleeve and rotatable axially therein, bearings between the moving parts, means for rotating the arbor, means including camming means operated by rotation of the arbor, for causing reciprocation of the arbor and said sleeve, means for supplying lubricant to said bearings, and said camming means, means including passage means in said sleeve and said arbor for supplying coolant fluid to said arbor socket, and means in said housing for preventing mixing of the coolant fluid with the lubricant.

14. In a machine tool attachment providing a drive for work piece drilling, a housing adapted for machine tool mounting and having a cylindrical bore, a bearing sleeve reciprocal in said bore, means retaining the sleeve against rotation in the bore, a drilling arbor having a socket, a pair of bearings between said sleeve and arbor rotatably supporting the latter coaxially of the sleeve, a collar on said arbor spacing said bearings, means for rotating the arbor, means including camming means operated by rotation of the arbor, for causing reciprocation of the arbor and said sleeve, means for supplying lubricant to one of said bearings, separate means for supplying lubricant to the other of said bearings and said camming means, means including passage means in said sleeve, said collar and said arbor for supplying coolant fluid to said arbor socket, and passage means in said housing and sleeve communicating with the passage means in said collar for venting seepage coolant fluid to the exterior of the housing.

References Cited in the file of this patent
UNITED STATES PATENTS

| | | |
|---|---|---|
| 1,700,668 | Damerell | Jan. 29, 1929 |
| 2,454,235 | Tomek | Nov. 16, 1948 |
| 2,458,929 | Clark | Jan. 11, 1949 |
| 2,474,720 | Billeter | June 28, 1949 |
| 2,869,402 | Bunnell | Jan. 20, 1959 |

UNITED STATES PATENT OFFICE
CERTIFICATE OF CORRECTION

Patent No. 3,028,771                                            April 10, 1962

William Bunnell

It is hereby certified that error appears in the above numbered patent requiring correction and that the said Letters Patent should read as corrected below.

Column 5, line 21, for "pressure" read -- pressured --; line 28, after "of" insert -- the --.

Signed and sealed this 24th day of July 1962.

(SEAL)
Attest:

ERNEST W. SWIDER
Attesting Officer

DAVID L. LADD
Commissioner of Patents